(12) United States Patent
Harris et al.

(10) Patent No.: US 7,298,632 B2
(45) Date of Patent: Nov. 20, 2007

(54) SECONDARY CURRENT COMPENSATION METHOD

(75) Inventors: William Ross Harris, Livonia, NY (US); Jerry Floyd Adams, Waterport, NY (US)

(73) Assignee: Xerox Corporation, Stamford, CT (US)

( * ) Notice: Subject to any disclaimer, the term of this patent is extended or adjusted under 35 U.S.C. 154(b) by 82 days.

(21) Appl. No.: 11/157,924

(22) Filed: Jun. 22, 2005

(65) Prior Publication Data

US 2006/0290330 A1 Dec. 28, 2006

(51) Int. Cl.
*H02M 3/335* (2006.01)
*H02M 7/44* (2006.01)

(52) U.S. Cl. .............................. 363/21.01; 363/21.09; 363/21.17; 363/97

(58) Field of Classification Search ............ 363/15–17, 363/20, 21.01, 21.04, 21.09, 21.12, 21.17, 363/97, 131
See application file for complete search history.

(56) References Cited

U.S. PATENT DOCUMENTS

| 4,038,593 | A | * | 7/1977 | Quinn | 363/97 |
| 4,484,256 | A | * | 11/1984 | Hartman | 363/26 |
| 6,430,062 | B1 | * | 8/2002 | Shin | 363/21.01 |
| 6,526,240 | B1 | | 2/2003 | Thomas et al. | |
| 6,954,060 | B1 | * | 10/2005 | Edel | 324/117 R |
| 2003/0115002 | A1 | | 6/2003 | Adams | |

* cited by examiner

*Primary Examiner*—Gary L Laxton
(74) *Attorney, Agent, or Firm*—Pillsbury Winthrop Shaw Pittman, LLP

(57) ABSTRACT

Techniques for correcting for internal resistance losses in the secondary windings of a transformer to reduce errors in output voltage from a high voltage power supply.

20 Claims, 2 Drawing Sheets

SECONDARY CURRENT COMPENSATION METHOD

BACKGROUND

All references cited in this specification, and their references, are incorporated by reference herein where appropriate for teachings of additional or alternative details, features, and/or technical background.

Disclosed in the embodiments herein is a method for correcting for internal resistance losses in the secondary windings of a transformer to reduce errors in output voltage from a high voltage power supply.

Certain devices have components that require a voltage high enough to cause corona discharge, a controlled static discharge. This corona discharge is used to charge or discharge a target member such as a photoreceptor belt in a xerographic copier or printer. This provides the component with sufficient instantaneous current density for proper operation, without exceeding a maximum average current value. In such components, if the required current density is greater than the desired average current, a chopped current at an appropriate duty cycle is required.

Some power supplies employ pulse amplitude modulation (PAM) for this type of use, which produces a high voltage pulse at a fixed duty cycle and varies the voltage to obtain the correct average current value. Other power supplies employ pulse width modulation (PWM) and pulse frequency modulation (PFM) all of which are used high voltage applications. In most cases, these switch-mode power conversion schemes are used to improve efficiency and reduce the size of magnetic devices such as transformers.

Among those devices that have such components are "image-on-image" xerographic color printers wherein multiple corotrons must be precision charged and controlled to provide desired print quality. FIG. 1 (prior art) is a simplified "image-on-image" xerographic color printer in which successive primary-color images are accumulated on a photoreceptor belt, and the accumulated superimposed images are in one step directly transferred to an output sheet as a full-color image.

Specifically, the FIG. 1 embodiment includes a belt photoreceptor 10, along which are disposed a series of stations, as is generally familiar in the art of xerography, one set for each primary color to be printed. For instance, to place a cyan color separation image on photoreceptor 10, there is used a charge corotron 12C, an imaging laser 14C, and a development unit 16C. For successive color separations, there are provided equivalent corotron, imaging laser and developer elements 12M, 14M, 16M (for magenta), 12Y, 14Y, 16Y (for yellow), and 12K, 14K, 16K (for black). The successive color separations are built up in a superimposed manner on the surface of photoreceptor 10, and then the combined full-color image is transferred at transfer station 20 to an output sheet. The output sheet is then run through a fuser 30, as is familiar in xerography.

Also shown in FIG. 1 is a set of what can be generally called "monitors," such as 50 and 52, which can feed back to a control device 54. The monitors such as 50 and 52 are devices which can make measurements to images created on the photoreceptor 10 (such as monitor 50) or to images which were transferred to an output sheet (such as monitor 52). These monitors can be in the form of optical densitometers, calorimeters, electrostatic voltmeters, etc.

Control of voltage to a component or load may be by way of one or more transformer(s). Transformers are magnetic devices consisting of two or more multiturn coils wound on a common core, the coil connected to the energy source being referred to as the primary coil or winding and the coil in which current is induced by the primary coil being referred to as the secondary coil or winding. As understood by those skilled in the art, the turns ratio of the primary coil to secondary coil determines the transformer's voltage ratio, an increase in turns of the secondary coil with respect to the primary coil resulting in a boost of voltage at the secondary.

In precision applications the accumulated errors contributing to output voltage variability, including variation in primary winding voltage, transformer turns ratio and various losses make it necessary to measure or infer output voltage and compare that to the desired output voltage in a closed-loop voltage control circuit. In the most simple topologies sensing resistors in conjunction with a potentiometer may be used at the primary coil of the transformer to measure and control voltage input into the transformer and from that the secondary, output, voltage. Sense elements attached to the low side of the secondary winding of a transformer may also be employed to measure output current and to detect output faults or current overloads.

Determination of output voltage at the secondary side of the transformer by inference of the measured voltage at the primary side may be designed and adjusted to properly compensate for the first two of three listed error contributors. Such determination may include inaccuracies due to internal resistance (IR) losses in the secondary windings (which typically comprise many, many windings of small diameter coils) as well as the IR losses associated with other external secondary resistances that may be included to protect the HV power source and load in the event of an arc or other fault condition. Correction of all such errors may be made by additional sense windings or the incorporation of divide down resistors on the secondary side, but these measures significantly add to expense and complexity of design. Errors in output voltage sensing may significantly degrade the accuracy of very sensitive devices. For example, "image-on-image" printing devices require precise control of high voltage sources to achieve outstanding print quality.

It would therefore be useful to permit primary side voltage sensing and regulation without need for secondary side voltage sensing. And to successfully do this, it may necessary to properly compensate for secondary IR loss in the primary side voltage sensing circuitry.

REFERENCES

U.S. Pat. No. 4,484,256, commonly assigned, discloses a pulsed high voltage variable duty cycle current generator. A circuit automatically controls the peak current output to a specific level and varies the average current output by varying the output duty cycle. To vary the output duty cycle, the average current at the secondary is sensed to control a modulator which drives two power transistors, each controlling half of the primary winding. When both transistors are on, there is no circuit output.

U.S. Patent Application Publication No. US 2003/0115002 (U.S. patent application Ser. No. 10/355,564), commonly assigned, relates to a circuit for determining the current of a xerographic charging device across a sense resistor in series with the charging device power supply, forming a second signal using a resistive voltage divider network across the power supply and forming a third signal using a resistor-capacitor charging circuit across the power supply, and then processing the first, second and third signals to form an output signal that is based on the corona current.

SUMMARY

Aspects disclosed herein include:

an adjustable high voltage power circuit comprising a high voltage source having a power supply side and a ground side; a transformer having a primary winding side and secondary winding side, the primary winding side being attached across the power supply side and the ground side of the high voltage source; a primary winding side voltage sensing and regulation circuit configured for measuring the voltage sense signal and regulating high voltage output of the high voltage source based on the voltage sense signal; a secondary winding side current sense circuit attached to the ground side of the transformer circuit for measuring internal resistance loss in the secondary windings and providing input to the primary winding side voltage sensing and regulation circuit to cause such circuit to adjust the voltage sense signal to account for voltage drop due to internal resistance loss in the secondary winding of the transformer;

a xerographic device comprising a high voltage power supply having a power supply terminal and a ground terminal; a transformer having primary and secondary windings, the transformer being coupled across the primary winding to the power supply terminal and the ground terminal; a primary winding side voltage sensing and regulation circuit coupled to the primary winding side of the transformer configured for measuring the voltage sense signal and regulating high voltage output of the high voltage power supply based on the voltage sense signal; a secondary winding side current sense circuit coupled to the ground side of the secondary winding of the transformer configured for measuring internal resistance loss in the secondary windings and providing input to said primary winding side voltage sensing and regulation circuit to cause the circuit to adjust the voltage sense signal to account for internal resistance loss due to the secondary windings of said transformer; and a method comprising measuring the voltage sense signal on the primary winding side of a transformer attached to a high voltage power supply; measuring the internal resistance loss of current in the secondary windings of said transformer; adjusting the voltage sense signal of the primary winding side of the transformer to compensate for internal resistance loss due to the secondary windings of the transformer.

BRIEF DESCRIPTION OF THE DRAWING

Various of the above mentioned and further features and advantages will be better understood from this description of embodiments thereof, including the attached drawing figures wherein.

DETAILED DESCRIPTION

Figure 1:
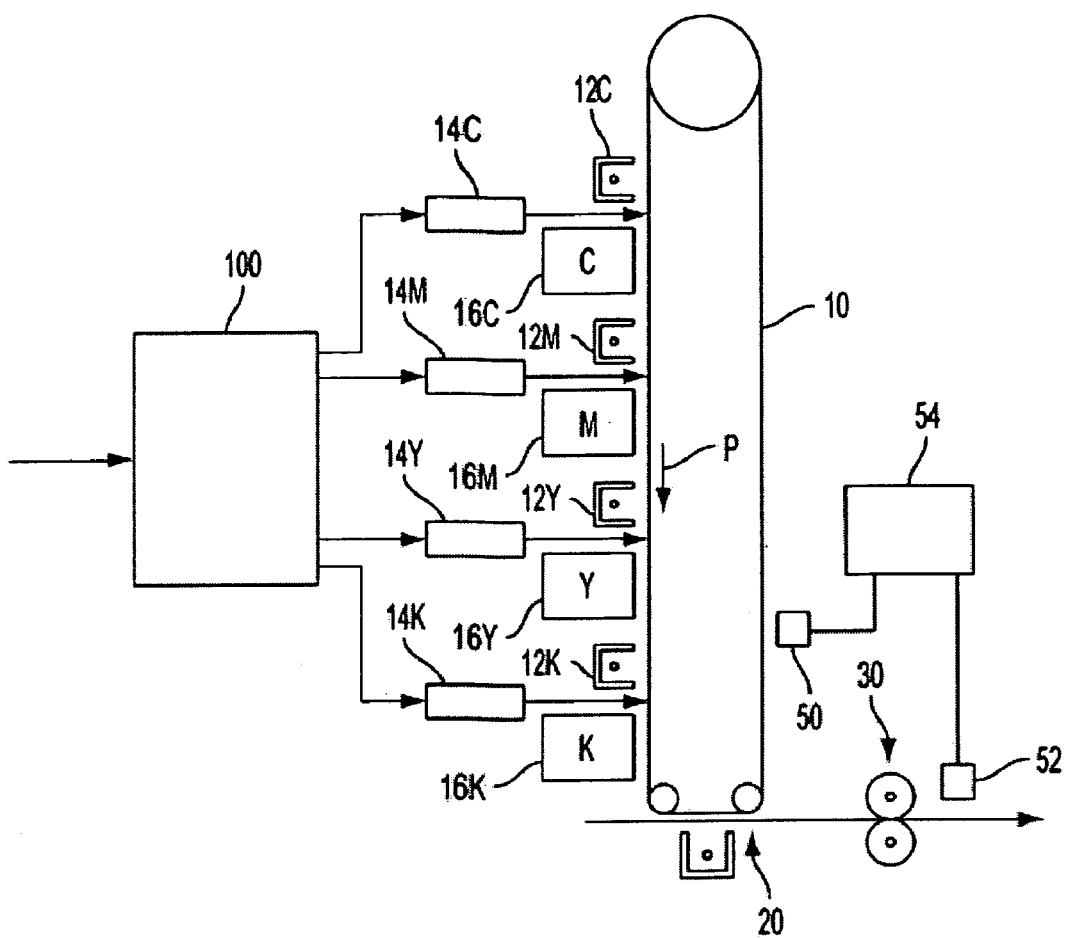
FIG. 1 (prior art) shows a simplified elevational view of certain elements of a xerographic color printer.

In embodiments there is illustrated an adjustable high voltage power circuit comprising a high voltage source having a power supply side and a ground side; a transformer having a primary winding side and secondary winding side, the primary winding side being attached across the power supply side and the ground side of the high voltage source; a primary winding side voltage sensing and regulation circuit configured for measuring the voltage sense signal and regulating high voltage output of the high voltage source based on the voltage sense signal; a secondary winding side current sense circuit attached to the ground side of the transformer circuit for measuring internal resistance loss in the secondary windings and providing input to the primary winding side voltage sensing and regulation circuit to cause such circuit to adjust the voltage sense signal to account for internal resistance loss due to the secondary windings of the transformer.

In such embodiment, the power supply may be AC or DC. The secondary winding side current sense circuit may comprise a potentiometer, and such circuit may be connected to the high voltage return terminal side. The high voltage terminal and the high voltage return terminal may be attached to a charge generation device, for example, a corotron. The primary winding voltage sense and regulation circuit may also comprise a potentiometer. The primary winding side voltage sense and regulation circuit may be connected both to the supply side of the high voltage source and the ground side of the high voltage source through a resistor. The primary winding side voltage sense and regulation circuit may be further configured to allow compensation for variation in transformer turn ratios.

In one embodiment, there is provided circuitry to allow for a high voltage power supply to automatically adjust for internal resistance losses due to the secondary windings of a transformer. In such embodiment, the voltage sense signal is adjusted by subtracting a controlled portion of the current that compensates for internal resistance loss in the secondary windings of the transformer. Such circuitry allows for improved primary side voltage sense and regulation by accounting for losses in the transformer.

In another embodiment, there is provided a secondary current sense circuit in the low side of a high voltage transformer circuit that provides input to a primary side voltage sense and regulation circuit, said primary side voltage sense and regulation circuit being configured to adjust the voltage sense signal to compensate for internal resistance loss in the secondary windings of a transformer and to regulate high voltage power output by the adjusted voltage sense signal. Such embodiment calls for output voltage control employing primary side voltage sensing without the need for additional sense windings. The circuits may be used in any device, including a xerographic device.

In yet another embodiment, there is provided a method comprising: measuring the voltage sense signal on the primary winding of a transformer attached to a high voltage power supply; measuring the internal resistance loss of current in the secondary windings of the transformer; and adjusting the voltage sense signal of the primary winding side of the transfer to compensate for internal resistance loss due to the secondary windings of the transformer.

The measurement of the voltage sense signal on the primary winding side of the transformer, and adjusting the voltage sense signal of the primary winding of the side of the transformer, may make use of a primary winding side voltage sense and regulation circuit configured for measuring the voltage sense signal and regulating high voltage output of the high voltage power supply. The measurement of the internal resistance loss of current in the secondary windings of the transformer may make use of a secondary winding side current sense circuit configured to measure internal resistance in the secondary windings of the transformer and provide input to the primary winding side voltage sense and regulation circuit to cause the circuit to adjust the voltage sense signal to account for internal resistance loss due to the secondary windings of said transformer.

Figure 2:
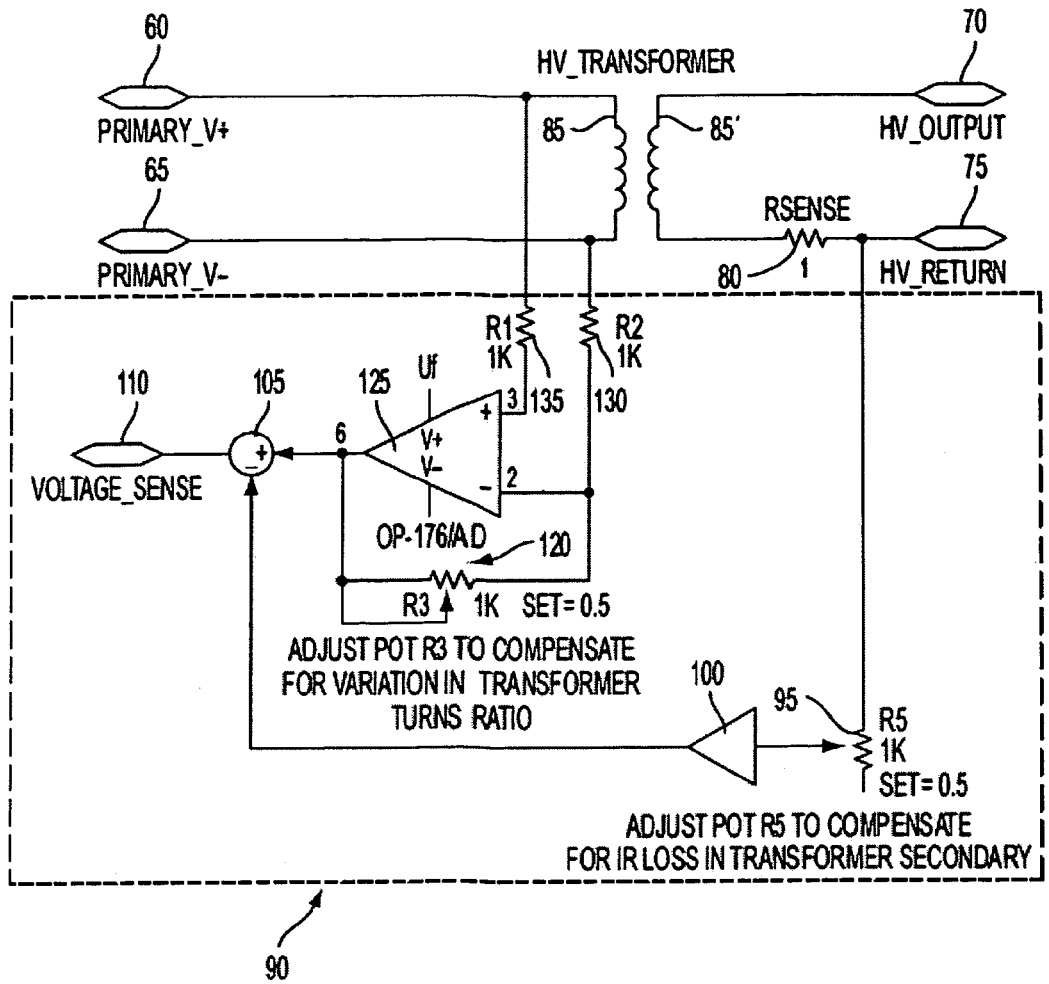
FIG. 2 illustrates a diagram of exemplary circuitry for regulating the high voltage power supply by adjusting for the internal resistance losses in the secondary windings of a transformer.

Now turning to the Figures, in FIG. 2 there is shown a diagram of exemplary circuitry for regulating high voltage power supply by adjusting for internal resistance losses in the secondary windings of a transformer. A high voltage source comprising a supply side 60 and a ground side 65 is connected to a transformer comprising primary windings 85 and secondary windings 85'. Secondary windings 85' of such transformer are connected to a high voltage output terminal 70 and a high voltage return terminal 75. Such circuit may be separated into a primary winding side voltage sense and regulation circuit 90 and a secondary winding side current sense circuit 80. Secondary winding side current sense circuit 86 comprises IR sense 80. Input from secondary winding current sense circuit 86 prevents input to primary winding side voltage sense and regulation circuit 90. Primary winding side voltage sense and regulation circuit 90 measures voltage input across the transformer on the primary winding 85 side by way of resistors 130, 135 and voltage regulator 125. Voltage sense 110 of the primary winding side voltage sense and regulation circuit 90 is altered by adjusting power source 105 to account for internal resistance loss due to the secondary windings. Potentiometer 120 is adjusted accordingly to compensate for the IR loss in the transformer secondary windings. As illustrated, primary winding side voltage sense and regulation circuit 90 may be designed to comprise potentiometer 120 to compensate for variation in transformer turn ratios for different transformers.

Note the schematic in FIG. 2 and the above description only describe the voltage sense and primary current compensation aspects of the HV power supply. The actual voltage regulation and primary side voltage drive portions are not included in either the figure or the text. Also missing are the steps required to correctly adjust the voltage sense and secondary current compensation parts of the HV power supply. However, artisans of ordinary skill will appreciate that the primary side voltage sense circuit is adjusted by applying a known voltage to the primary of an unloaded transformer at the normal operating frequency; measuring the actual secondary voltage with a precision, high impedance AC HV Voltmeter; and adjusting Resistor 120 to achieve an exact analog representative of the secondary voltage at the output of Amplifier 125. This procedure compensates the voltage sense circuit for variation in transformer turns ratio.

The secondary current compensation circuit is adjusted by applying a known voltage to a transformer at the normal operating frequency. This transformer is at first unloaded and the secondary voltage measured as is the voltage at the output of the Difference Stage 105. Next the transformer is loaded with a typical load device along with any series resistance that will be present in the final application (such as a series resistor for arc protection.)

The secondary voltage is again measured, this time downstream of the series resistor, and again the output voltage of Difference Stage 105. Resistor 95 is adjusted such that the output of Difference Stage 105 has dropped in the same proportion as the transformer secondary voltage. For instance, if transformer secondary voltage has dropped 5% from the unloaded to the loaded measurements, then Resistor 95 is adjusted so that the Difference Stage 105 output voltage also drops by 5%. As now adjusted, this stage should cause the voltage feedback signal, used to regulate the output voltage, to reflect the exact secondary voltage including any IR voltage drops within the transformer secondary and any external protection resistors, and this allows the voltage regulation circuit (not shown in the figure or described in the text) to correctly regulate the output voltage under various load conditions. This is the desired behavior of this invention.

While the invention has been particularly shown and described with reference to particular embodiments, it will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An adjustable high voltage power circuit, comprising:
   a high voltage source having a power supply circuit side and a groundside;
      a transformer having a primary winding side and secondary winding side, said primary winding side being attached across said power supply side and said ground side of said high voltage source;
   a primary winding side voltage sensing and regulation circuit configured for measuring a voltage sense signal and a regulating high voltage output of said high voltage source based on said voltage sense signal;
   a secondary winding side current sense circuit attached to the groundside of said transformer circuit for measuring internal resistance loss in the secondary windings and providing input to said primary winding side voltage sensing and regulation circuit to cause said primary winding side voltage sensing and regulation circuit to adjust the voltage sense signal to account for internal resistance loss due to the secondary windings of the transformer; and
   a difference stage for adjusting said voltage sense signal by subtracting a controlled portion of a current that compensates for the internal resistance loss in said secondary winding side, said difference stage coupled to said primary winding side voltage sensing and regulation circuit;
   wherein the internal resistance loss in the secondary windings is measured as a first potential drop and
   wherein such circuit adjustment is measured in the same proportion as the first potential drop, to the transformer.

2. The power supply circuit in accordance with claim 1 wherein the power supply is an AC power source.

3. The power supply circuit in accordance with claim 2 wherein the secondary winding side current sense circuit is connected to the high voltage return terminal side.

4. The power supply circuit in accordance with claim 2 wherein the high voltage terminal and the high voltage return terminal are attached to a charge generation device.

5. The power supply circuit in accordance with 4 wherein the charge generation device is a corotron.

6. The power supply circuit in accordance with claim 1 wherein the primary winding side voltage sense signal circuit comprises a potentiometer.

7. The power supply circuit in accordance with claim 1 wherein the secondary winding side current sense circuit comprises a potentiometer.

8. The power supply circuit in accordance with claim 1 wherein the primary winding side voltage sensing and regulation circuit is connected both to the supply side of the high voltage source and the ground side of the high voltage source through a resistor.

9. The power supply circuit in accordance with claim 1 wherein the primary winding side voltage sensing and regulation circuit is further configured to allow compensation for variation in transformer turn ratio.

10. A xerographic device, comprising:
  a high voltage power supply having a power supply terminal and a ground terminal;
  a transformer having primary and secondary windings, said transformer being coupled across said primary winding to said power supply terminal and said ground terminal;
  a primary winding side voltage sensing and regulation circuit coupled to said primary winding side of said transformer configured for measuring a voltage sense signal and a regulating high voltage output of said high voltage power supply based on said voltage sense signal;
  a secondary winding side current sense circuit coupled to the ground side of the secondary winding of said transformer configured for measuring internal resistance loss in the secondary windings and providing input to said primary winding side voltage sensing and regulation circuit to cause said primary winding side voltage sensing and regulation circuit to adjust the voltage sense signal to account for internal resistance loss due to the secondary windings of said transformer within the xerographic device; and
  a difference stage for adjusting said voltage sense signal by subtracting a controlled portion of a current that compensates for the internal resistance loss in said secondary windings, said difference stage coupled to said primary winding side voltage sensing and regulation circuit.

11. The xerographic device in accordance with claim 10 wherein the primary winding side voltage sensing and regulation circuit is further configured to allow compensation for variation in transformer turn ratio.

12. The xerographic device in accordance with claim 10 wherein the secondary winding side comprises a high voltage output terminal and a high voltage return terminal.

13. The xerographic device in accordance with claim 12 wherein the secondary winding side current sense circuit is connected to the high voltage return terminal side.

14. The xerographic device in accordance with claim 12 wherein the high voltage terminal and the high voltage return terminal are attached to a charge generation device.

15. The xerographic device in accordance with claim 14 wherein the charge generation device is a corotron.

16. The xerographic device in accordance with claim 10 wherein the primary winding side voltage sense and regulation circuit comprises a potentiometer.

17. The xerographic device in accordance with claim 10 wherein the secondary winding side current sense circuit comprises a potentiometer.

18. A method comprising:
  measuring a voltage sense signal on a primary winding side of a transformer attached to a high voltage power supply;
  measuring an internal resistance loss of current in a secondary windings of said transformer;
  subtracting a controlled portion of a current that compensates for the internal resistance loss in said secondary windings with a difference stage;
  adjusting the voltage sense signal of the primary winding side of the transformer to compensate for internal resistance loss due to the secondary windings of the transformer;
  wherein the internal resistance loss in the secondary windings is measured as a first potential drop; and
  wherein such circuit adjustment is measured in the same proportion as the first potential drop, to the transformer.

19. The method in accordance with claim 18 wherein measuring the voltage sense signal on the primary winding side of said transformer and adjusting the voltage sense signal of the primary winding side of the transformer make use of a primary winding side voltage sensing and regulation circuit configured for measuring the voltage sense signal and regulating high voltage output of said high voltage power supply.

20. The method in accordance with claim 18 wherein measurement of the internal resistance loss of current in the secondary windings of the transformer makes use of a secondary winding side current sense circuit configured to measure internal resistance loss in the secondary windings of the transformer and provides direct unmodulated input to said primary winding side voltage and regulation circuit to cause said circuit to adjust the voltage sense signal to account for internal resistance loss due to the secondary windings of said transformer.

* * * * *